United States Patent
Mark

(10) Patent No.: US 7,419,626 B2
(45) Date of Patent: Sep. 2, 2008

(54) METHOD FOR INJECTION MOLDING A PLASTIC MONOLITH

(75) Inventor: Phillip Mark, Orlando, FL (US)

(73) Assignee: Young Microbrush, LLC, Wilmington, DE (US)

( * ) Notice: Subject to any disclaimer, the term of this patent is extended or adjusted under 35 U.S.C. 154(b) by 401 days.

(21) Appl. No.: 10/965,825

(22) Filed: Oct. 18, 2004

(65) Prior Publication Data

US 2005/0104249 A1    May 19, 2005

Related U.S. Application Data

(62) Division of application No. 10/155,135, filed on May 28, 2002, now abandoned.

(51) Int. Cl.
 *B29C 45/16* (2006.01)
(52) U.S. Cl. .......... 264/243; 264/255; 264/328.12; 425/805
(58) Field of Classification Search .......... None
See application file for complete search history.

(56) References Cited

U.S. PATENT DOCUMENTS

| | | | | |
|---|---|---|---|---|
| 2,592,296 A | * | 4/1952 | Kutik | ............ 264/318 |
| 2,651,810 A | | 9/1953 | Snyder | |
| 3,235,438 A | | 2/1966 | Wisotzky | |
| 3,781,402 A | | 12/1973 | Hanggi | |
| 4,244,076 A | * | 1/1981 | Meyer | ............ 15/188 |
| 4,422,986 A | | 12/1983 | Cole | |
| 4,444,711 A | * | 4/1984 | Schad | ............ 264/243 |
| 4,712,936 A | | 12/1987 | Kessler | |
| 4,804,004 A | | 2/1989 | Taylor et al. | |
| 5,162,092 A | | 11/1992 | Klobucar et al. | |
| 5,171,066 A | | 12/1992 | Klinkhammer | |
| 5,316,027 A | | 5/1994 | Klinkhammer | |
| 5,352,025 A | * | 10/1994 | Huang | ............ 300/21 |
| 5,531,582 A | | 7/1996 | Klinkhammer | |
| 5,609,890 A | | 3/1997 | Boucherie | |
| 5,765,573 A | | 6/1998 | Gueret | |
| 5,792,411 A | | 8/1998 | Morris et al. | |
| 6,311,359 B1 | | 11/2001 | Brezler, III | |
| 6,343,607 B1 | | 2/2002 | Gueret | |
| 6,554,614 B1 | | 4/2003 | Dubbe et al. | |
| 2003/0115704 A1 | | 6/2003 | McConnell | |
| 2003/0153884 A1 | * | 8/2003 | Underhill et al. | ............ 604/361 |

FOREIGN PATENT DOCUMENTS

GB    2151971    *    7/1985

* cited by examiner

*Primary Examiner*—Edmund H. Lee
(74) *Attorney, Agent, or Firm*—McDermott Will & Emery LLP

(57) ABSTRACT

A brush is injection molded in a multipart mold. The bristles of the brush are sequentially molded integrally with the base or handle. The bristles are extremely small and are injection molded in a unique molds. The bristle portion of the mold consists of a series a plates or semi-sphere cups, each of which is drilled with a diminutive drill bit. The plates and cups are then assembled so that the bores of the plates and cups are aligned to form the bristle containing portion of the mold. The mold portion for the bristles is injection molded with a first resin material. Then base or handle producing portion of the mold is injected with a second resin material. The selection of applicable resins, seize of bristles, spacing of bristles, viscosity of the to-be-dispensed fluid all considered in the defining of the amount of liquid to be carried and dispensed by the brush.

4 Claims, 4 Drawing Sheets

METHOD FOR INJECTION MOLDING A PLASTIC MONOLITH

This application is a divisional of Ser. No. 10/155,135 filed May 28, 2002 now abandoned.

BACKGROUND

This invention relates to an apparatus and method for molding a plastic monolith base by the injection process, and in particular, a plastic monolith comprised of a base of plastic resin material having elongated bristles at least at one end of the monolith. The bristles in an embodiment are of the same resin material and in another embodiment the monolith and the bristles are of different resins but in any case the monolith and the bristles are integrally injection molded.

SUMMARY OF THE INVENTION

The apparatus and method is particularly applicable to the injection molding of a relatively small dispensing brush and/or spreading brush.

The said novel brushes are integrally molded in a multi-compartmented mold. The mold is constructed of a metal by means of casting and appropriate machining. More importantly, the mold surface is detailed with recesses to produce the bristles, i.e., being indented by drilling a very small diameter bore. The depth of the so produced bore is dependant upon the length of the bristle desired.

Each mold proximate to the bristle area is drilled a plurality of times dependent upon the number of bristles that the monolith is designed to carry.

Therefore, the number of bristles produced in the mold will be predetermined. The diameter of the bristle may vary. The length of the bristle may also vary The spacing between the bristles can also vary. Finally, the resin, i.e., the thermoplastic material employed for the monolith can vary and for the produced resultant bristles may also vary It will be appreciated that all of these enumerated variances will be dependent upon the co-efficient of tension of the to-be-applied liquid, expressed in another manner, by the viscosity of the to-be-applied or dispensed liquid.

For instance, if the bristles are well spaced and the liquid to-be-dispensed has a low viscosity less liquid will be retained between the bristles than if the liquid-to-be dispensed has a vary high viscosity.

Where it is desired for the bristles of the brush to capture a large amount of high viscosity liquid, a brush with relatively great spaced bristles will be desirable.

The selection of the thermoplastic material plays a large roll. For instance, a highly hydrophobic plastic will carry less water based to-be applied liquid than a lesser hydrophobic plastic material.

The monolith base contemplated in the present invention maybe a solid cylindrical rod handle or a tube. In any case the handle will be required to be relatively stiff having little or no memory while the bristles, on the other hand, will be soft and be possessed of a degree of memory to aid the fibers of the bristle to return to their original position after each stroke.

It is contemplated that the handle will be injected molded with a relatively rigid resin material such as polycarbonate while the bristles may be selected from polyethylene, polypropylene and nylon. Other applicable, resin materials for the monolith base may be styrene, acetyl and polyvinyl-chloride. The bristles or fibers may also include santopreme and a softer polyvinyl chloride.

The mold is mounted in a rotatable chuck like carriage. In a first position the mold is injected with the resin adapted to result in the monolith base or handle. Subsequently, the mold is rotated to a second position at which point the mold is charged with the second resin material detailed to produce the bristles. It is contemplated that the injection procedure sequence may be reversed. It will be seen that the number of cavities in the mold results in a predetermined definitive number of bristles resulting in a brush having certain desired efficacy.

The mold element having the cavities for the bristles is replete with a plurality of minute cavities produced by mechanically drilling with extraordinary small diameter drill bits.

In order to ease the removal of the bristles and the integrally produced monolith base from the mold, it has been found desirable for the cavities to be somewhat tapered. Therefore, the range of the diameter of the bristles will range from 0.009 inch at the base of the bristle to 0.004 inch at the very end of bristles.

A feature of the present invention is the spacing achieved of the individual bristles or fibers. The resulting bristles or fibers may be positioned in any design pattern with the aim not to have any of bristles abut against each other. The range of the length of the bristles or fibers will be from 0.050 to 0.500 inches in length.

It is submitted that the spacing of the bristles and their length gives the present brush its best and unexpected features. In detail, the present brush will pick up a liquid mostly by capillary action. The resultant design of the brush will entrain a specific amount of the to-be-applied liquid between the bristles without dropping or spilling. The brush will release the liquid material by daubing or stroking. Therefore, the spacing of the individual bristles from each other will be determinant of the intended final use of the brush. It will be seen that the brush of the present invention may be used to dole out a specific amount of material to be applied by way of the bristles as they flow the liquid to a receiving surface.

It has been found propitious that when the end of a cylindrical rod handle or monolith has a diameters of 0.140 inches, the number of bristles may range between 40 to 200.

In those situations, where the integrally produced bristles are at the end of a tube monolith and extend linearly and axially therefrom, the number of bristles may range from 18 to 100, depending in large part on the outer diameter and the inner diameter of the tube.

In the foregoing, it has been demonstrated and disclosed that the bristles extend linearly and axially with respect to either a rod monolith or a tubular monolith.

It is also contemplated herein that the bristles extend outwardly from a ball that is integral with a handle portion which may be a rod and the like.

The number of bristles on the ball in such a situation is in the range of between 70 to 100 bristles with respect to each ball. In fabricating a mold applicable to producing a ball; the mold is made by employing an EDM machining to cut out one-half of the mold along its length. A relatively tiny bowl is achieved employing an EDM (electric discharge machine) to cut out ½ of the mold thereby producing a concavity that is to produce one-half of the ball. A mirror image complementary mold is similarly constructed for the other half. A small bowl-like concavity is thereby produced which will be at the to be molded monolith handle. A drilling machine to drill the plurality of recesses is employed to step wise drill the elongated spaced bores that will result in the bristles in the same manner as discussed in the foregoing. The mold is either step wise-arcuately moved and the drilling is achieved perpendicularly to the surface of the inside of the bowl like cavity or the drilling machine is step wise moved.

The mold and the machinery utilized in making a two part resin product requires the mold to accept a shot of one resin and then to sequentially follow with a co-injection of another resin upon rotating the mold to a second position. In a dual mold arrangement it is contemplated that the other side of the mold be injected with the first resin as the first mold is injected with the second resin.

The tube construction requires an insertable slide in the mold to provide for the tube and another slide on the opposite end of the tube to permit the creation of the bristles.

When the resultant is a rod and ball arrangement the mold so employed does not require a slide to separate the mold from the injected bristles.

The resin material of both species may be the same. The selection of the resin-employed is dependent on the characteristic desired of the resultant brush.

The applicable mold in fabricating the instant brushes consists of a stacked plates of hardened tool steel, each being 0.050 thick and two and one-half inches long and from 0.025 to 2 inches wide. The plates are drilled with a high precision drill to a tolerance of 2 microns. The plates begin with a hole diameter of 0.009 and are subsequently serially reduced in diameter on each plate between 0.005 and 0.001 inches. The applicable drills employed are carbide drill bits which normally cannot drill through more than 0.050 inch thick materials at one time. The resultant bores produced are tapered. The depth of the hole ranges from 0.100 in depth to 0.500 inches in depth.

A many layered steel plate may contain an internal elective resistance heater to aid resin-material in migrating to the last plate containing the smallest diameter hole.

Furthermore, the backing plate is designed in such a manner to permit air to escape and to mechanically force air back into the mold to aid the bristles in exiting the mold on the completion of the cycle. It will be appreciated that there can be no undercuts in the stepping of the mold or the bristles will not be freed of the mold.

DETAILED DESCRIPTION OF THE DRAWINGS

As stated in the foregoing the injected molded brush may have a ball of configured bristles or may have axially linearly extending bristles either from a rod handle or a tubular handle.

The fabrication of either the ball bristles or the bristles extending from the rod handle or tubular handle both require, as stated, in the above, the drilling of a series of plates or nestable semi-spheres.

Figure 1:
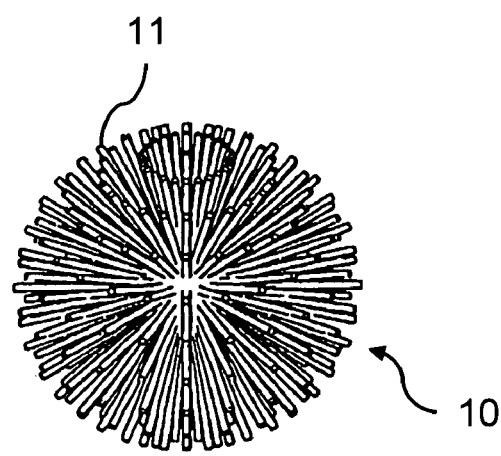
FIG. 1 is a view of the ball having the resultant bristles of the present invention.
Figure 2:
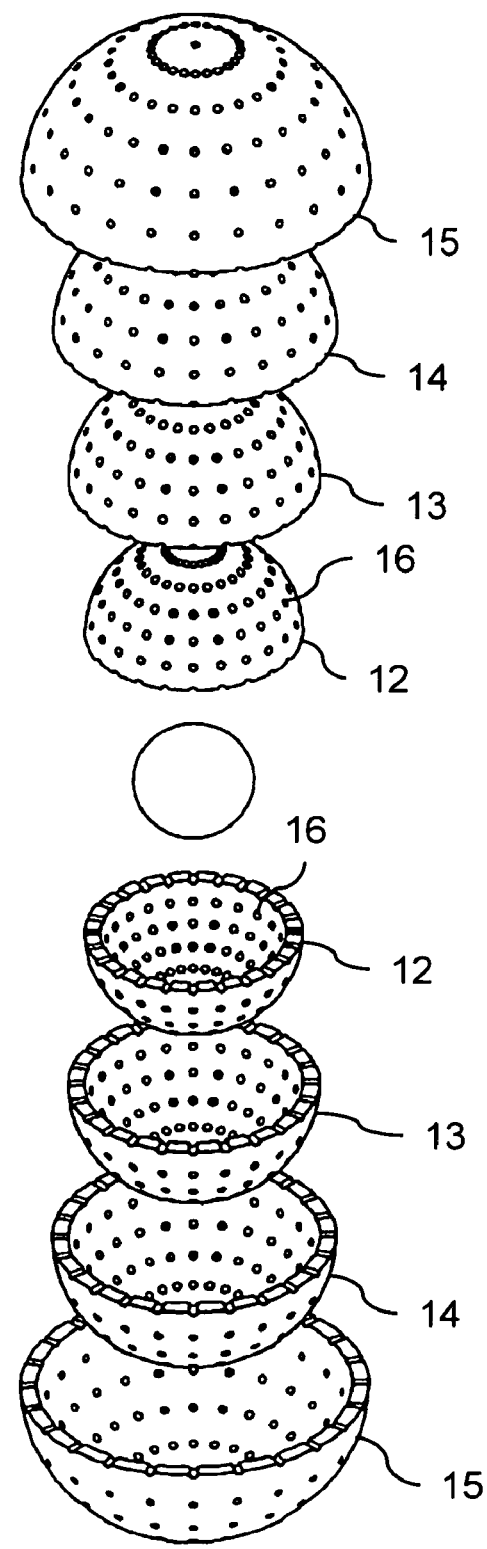
FIG. 2 is a view of the mold portion for fabricating ball of FIG. 1.

FIG. 1, shows the bristles 11 extending form a ball 10. FIG. 2 is detailed to illustrate the assembly of a series of nesting, pre-drilled semi-spheres 12, 13, 14 and 15. Each has a series of bores 16. Semi-sphere 12 is of the smallest diameter, but has the largest bore 16. Semi-sphere 13 is of slightly larger diameter but possesses a bore of somewhat smaller diameter. Semi-sphere 14 is still of a slightly larger diameter with bores of still somewhat smaller diameter than in semi-sphere 13. Finally, semi-sphere 15 is yet of a slightly larger diameter with bores of yet somewhat smaller diameter. The nesting semi-spheres when employed as a mold sits in a solid structure 19 as shown in FIGS. 4, 5, 7 and 8.

Figure 3:
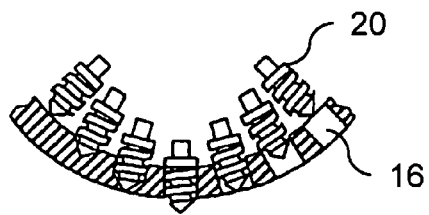
FIG. 3 is a cross-sectional fragmentary portion of one semi-sphere showing a succession of bits operating to drill bores.

FIG. 3 illustrates the employment of drill bit 20 in order to drill the said bores 16. FIG. 3 does not depict the use of a plurality of drill bits 20, but rather is designed to show a single drill in a various position of drilling so is schematic. The bit holder moves in a stepwise manner to drill the plurality of bores.

Figure 4:
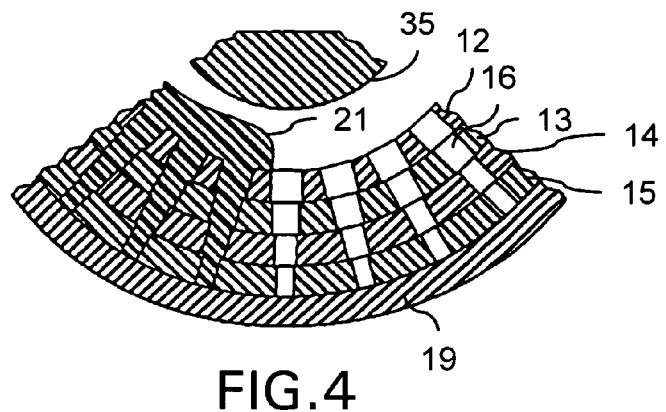
FIG. 4 is a cross-sectional fragmentary portion of the assembled nesting semi-spheres of the mold with aligned bores and with the resin being injected to fill, in succession, the bores.
Figure 5:
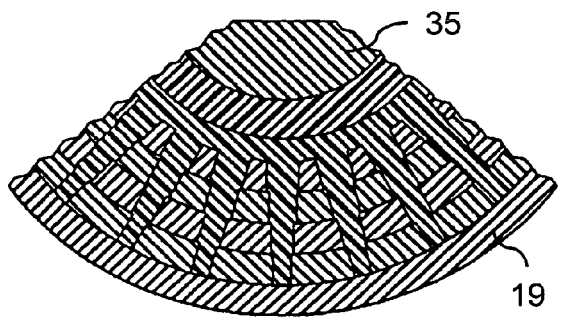
FIG. 5 is a cross-sectional fragmentary portion of the mold of FIG. 4 with all of the resin in place.
Figure 6:
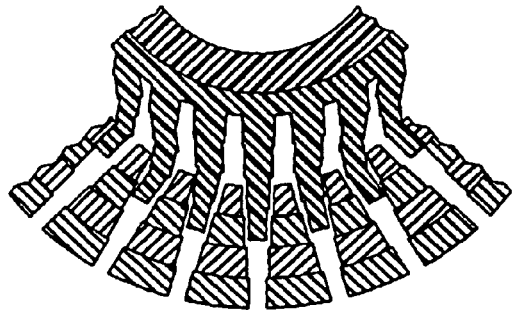
FIG. 6 is a similar view of FIG. 5 showing the mold being unloaded.
Figure 7:
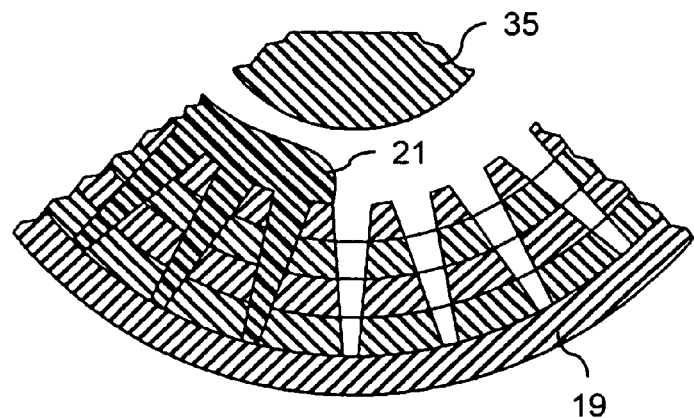
FIGS. 7, 8 and 9 are similar to FIGS. 4, 5 and 6 showing the bores with a smooth taper and the bristles produced thereby truly conical.
Figure 8:
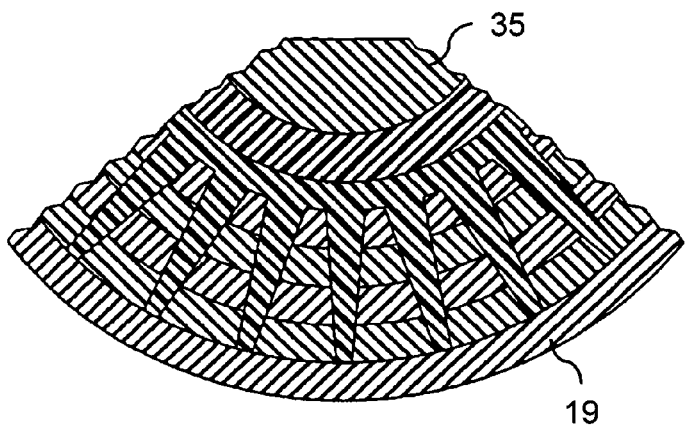
Figure 9:
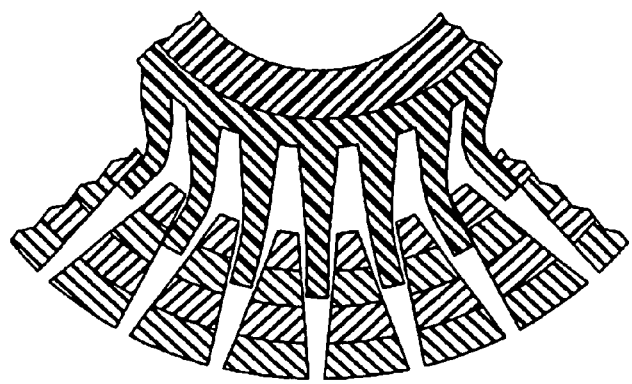

When the bores are fashioned and the semi-spheres are nestingly assembled the mold is completed. FIG. 4 shows the resin 21 progressively being injected into the mold thereby filling each of the bores in a successive manner. It will be appreciated that the act of injection molding will be extremely rapid. The view shown by FIGS. 4 and 7 for instance, is as if the injection molding was in very slow motion. Additionally, in a further aside, it should be noted that the molds of the Figures are extremely minute and the bores are of a diameter as detailed in the foregoing thereby requiring that said nesting of semi-spheres, in one embodiment and of plates in another embodiment.

Figure 10:
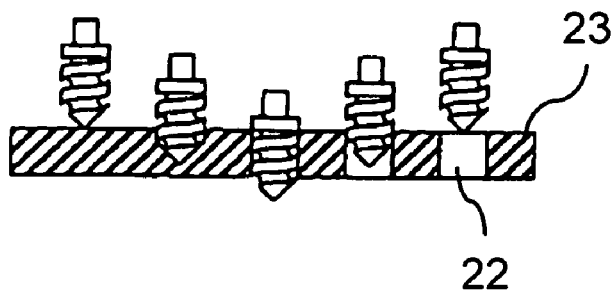
FIG. 10 is a cross-sectional fragmentary view of a portion of the mold in another embodiment.
Figure 12:
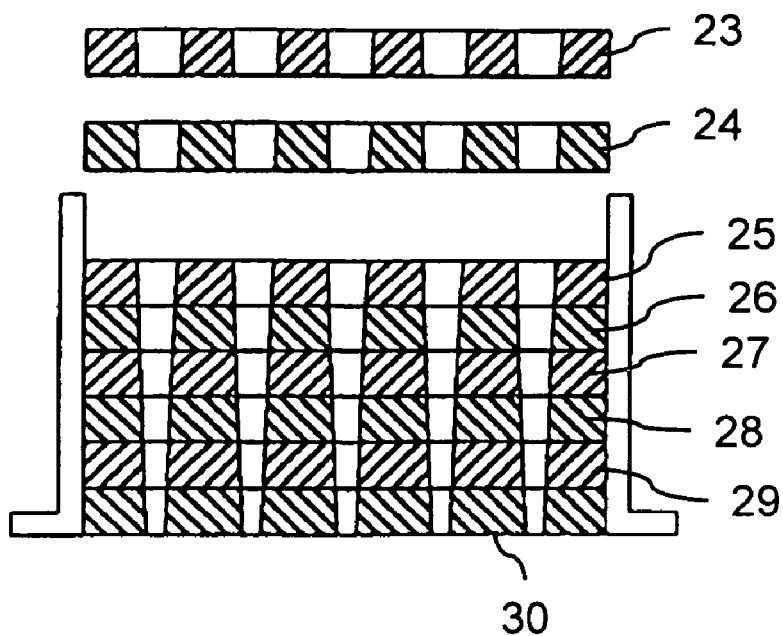
FIG. 12 is a cross-sectional fragmentary view similar to FIG. 11 showing a gradual tapering of the bores.
Figure 11:
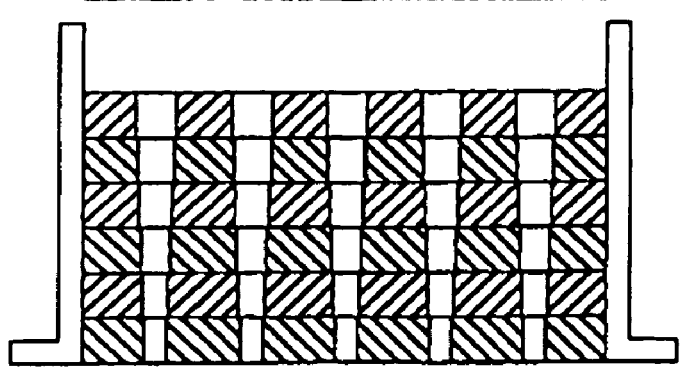
FIG. 11 is a cross-sectional fragmentary view of a series of plates that have been aligned showing in staggered step wise a plurality of bores.

Attention is now directed to FIGS. 10, 11 and 12 for the second embodiment, that is, to produce the linearly and axially extending bristles. FIG. 10 illustrates a flat plate 23 with a plurality bores 22 being drilled thereinto by drill bits 20. Again a number of drill bits 20 are depicted but actually it is the same drill bit 20 in a series of stepwise progressions to complete the drilling of a series of spaced bores 22. Plates shown by reference numerals 23, 24, 25, 26, 27, 28, 29 and 30 in FIGS. 11 and 12 are shown each with successive reduced bores 22.

In FIGS. 11 and 12 it will be seen that the various plates are assembled. To ensure that the plates will be in proper alignment an aligning fixture 31 is employed to produce a either a step-wise staggered mold as shown by FIG. 11. In FIG. 12, it will be seen that the assembled plates 23, 24, 25, 26, 27, 28, 29, 30 result in smooth walled conical bores for the to-be-injection molded resin material.

In the Figures pertaining to the ball a filler 35 may be included or preferably the ball will be a solid injection molded mold. The latter because of the tiny dimensions considered herein.

While only the bristle portion has been depicted and detailed herein, it is submitted that the rod handle of the ball, the rod handle of the axially and linearly extending bristles and the tubular handle of the axially and linearly extending bristles is conventional as depicted in voluminous prior art documents.

It will be apparent to those stilled in the art that various modifications and variations can It will be apparent to those stilled in the art that various modifications and variations can be made to the structure and methodology of the present invention without departing from the scope or spirit of the invention. Thus, it should be understood that the invention is not limited to the embodiment and examples discussed in the specification. Rather, the present invention is intended to cover modifications and variations of this invention, provided they fall within the scope of the following claims and their equivalents.

What is claimed is:

1. A method of making a brush having a polymeric base portion and integral therewith a polymeric bristle portion comprising:
   a) providing a plurality of plates, said plates being either flat or arcuate;
   b) drilling each of said plates with bores of a diameter of between 0.009 to 0.004 inches and the bores of each respective plate substantially uniform in diameter and substantially uniformly spaced apart;
   c) assembling and overlaying each of said plates whereby the plates have their respective bores diminishing in diameter;
   d) aligning the bores of said plates to thereby provide a plurality of cavities, each of substantially uniform diminishing diameter;
   e) forming a mold from said assembled and aligned plates wherein said cavities are open at the largest diameter portion of the respective cavities to a connecting chamber;
   f) injecting said cavities of said mold through said connecting chamber with a first polymeric material to thereby form bristles of said bristle portion;
   g) injecting said connecting chamber with a second polymeric material different from said first nolymeric material to thereby produce said base portion.

2. A method for making the brush of claim 1 wherein said plates have a thickness of 0.050 inches.

3. A method for making the brush of claim 1 wherein the depth of the cavities ranges from 0.100 inches in depth to 0.050 inches in depth.

4. A method for making the brush of claim 1 wherein said plates are constructed of steel.

* * * * *